United States Patent
Schwersmann et al.

(10) Patent No.: US 6,802,771 B2
(45) Date of Patent: Oct. 12, 2004

(54) ADJUSTABLE APPARATUS FOR SEPARATING GRAIN FROM HARVESTED CROP

(75) Inventors: Berthold Schwersmann, Bad Iburg (DE); Gregor Gogolin, Münster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/215,841

(22) Filed: Aug. 8, 2002

(65) Prior Publication Data

US 2003/0032465 A1 Feb. 13, 2003

(30) Foreign Application Priority Data

Aug. 10, 2001 (DE) .......................... 101 39 539

(51) Int. Cl.[7] .............. A01F 7/06; B02B 3/06
(52) U.S. Cl. .............. 460/69; 460/81; 460/83; 460/109
(58) Field of Search .............. 460/69, 107, 108, 460/109, 80, 81, 83, 101, 102

(56) References Cited

U.S. PATENT DOCUMENTS

| | | | |
|---|---|---|---|
| 3,537,459 A | | 11/1970 | Thomas |
| 4,075,823 A | * | 2/1978 | Rowland-Hill .............. 56/14.6 |
| 4,222,395 A | * | 9/1980 | Johnston et al. .............. 460/66 |
| 4,869,272 A | | 9/1989 | Ricketts et al. |
| 5,152,717 A | * | 10/1992 | Nelson et al. .............. 460/122 |
| 5,334,093 A | * | 8/1994 | Jensen et al. .............. 460/83 |

FOREIGN PATENT DOCUMENTS

| | | |
|---|---|---|
| DE | 1989612 | 7/1968 |
| DE | 6919051 | 9/1969 |
| DE | 3832996 | 4/1989 |
| DE | 19525244 | 1/1997 |
| EP | 0 591 688 | 4/1994 |

* cited by examiner

Primary Examiner—Árpád Fabián Kovács
(74) Attorney, Agent, or Firm—Husch & Eppenberger, LLC; Robert C. Haldiman; David A. Chambers

(57) ABSTRACT

An agricultural harvesting machine for removing and separating grain from harvested crop has a threshing zone and at least one separation zone for separating the grain. The axial separating rotor is at least partially encased by a separating housing having a plurality of sections. At least one of the sections is displaceable in the axial direction of the at least one axial separating rotor to increase the opening and ensure separation when a correspondingly large proportion of grain are in the outer region of the rotating crop stream and the proportion of admixtures is small.

19 Claims, 5 Drawing Sheets

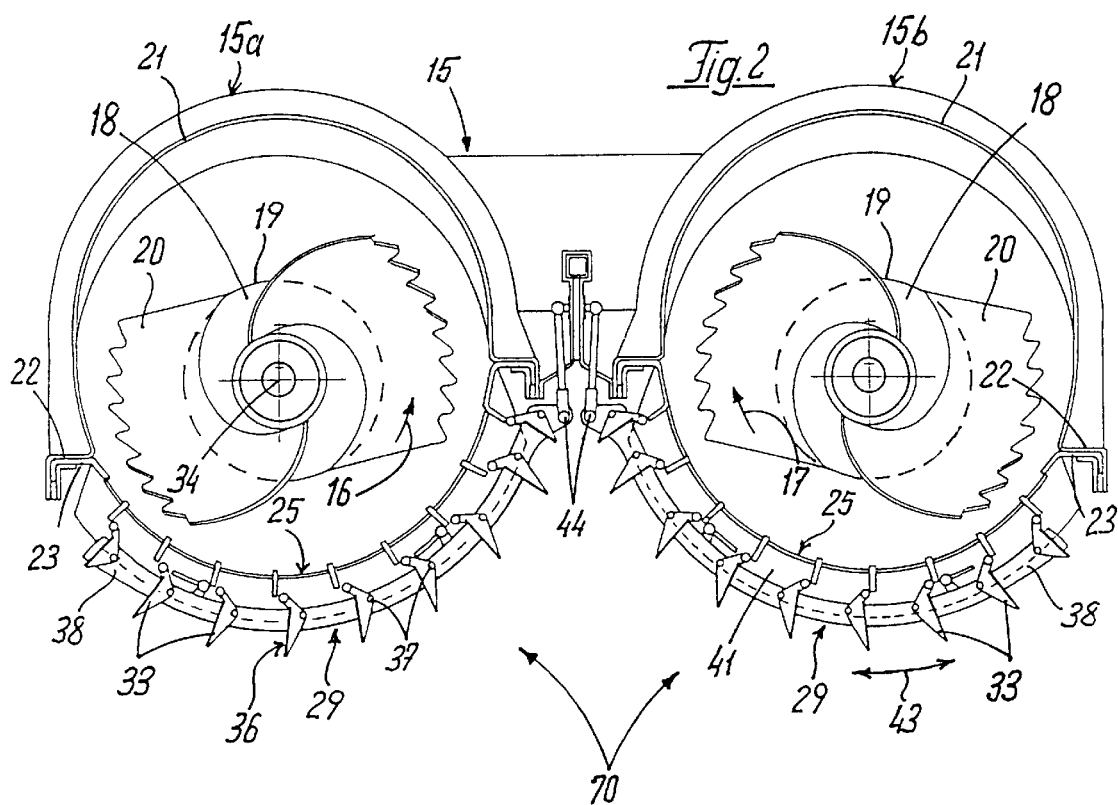
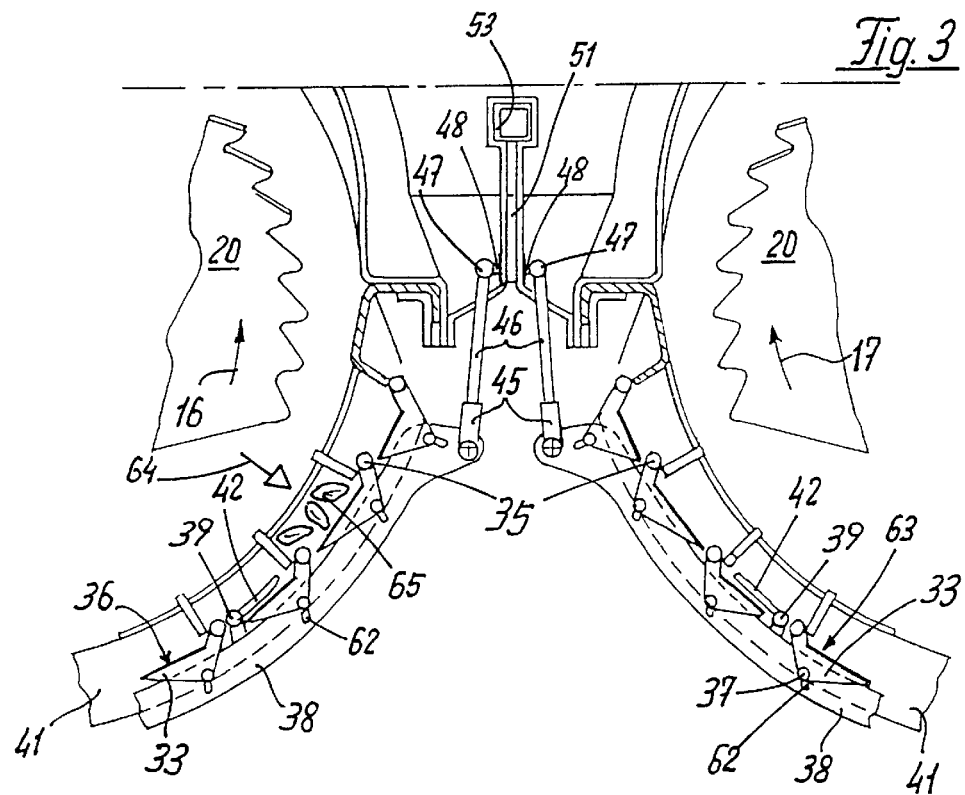

ADJUSTABLE APPARATUS FOR SEPARATING GRAIN FROM HARVESTED CROP

TECHNICAL FIELD OF THE INVENTION

The invention relates generally to the field of agricultural machinery and, more specifically, to an agricultural machine having apparatus for separating grain from harvested crop.

DESCRIPTION OF THE RELATED ART

A combine harvesting machine having a single-cylinder or multi-cylinder threshing mechanism in a rear region is disclosed in EP 0 591 688. The single-cylinder or multi-cylinder threshing mechanism is associated with one or two axial separating rotors, respectively, along a longitudinal direction of the combine harvester. Each of the axial separating rotors has a rotating rotor therein which is provided with entraining elements at its circumference and which, at least in its bottom region, cooperates with a separating grate fixed to the frame and at least partially encasing the rotor. At the top, the rotor is enclosed by enveloping surfaces in such a way that between the rotor, the separating grate and these enveloping surfaces is formed a through-gap through which the agricultural crop is conveyed in spiral paths along the rotor axis by the axial separating rotor. During this conveying process, separation of the grain and straw mixture conveyed by the axial separating rotor occurs, wherein grains, short straw and chaff are separated by the openings formed in the separating grates. In the front region of the axial separating rotor, a considerable proportion of short straw and chaff, so-called impurities, is separated, as the grains which are in the crop stream must first be conveyed by the action of centrifugal force into an outer edge region of the crop stream before they can be separated in the region of the separating grates. To facilitate separation of admixtures, intensive cleaning of the separated crop mixture is required. The cleaning systems are provided for this purpose and mounted behind the axial separating rotor in the agricultural harvesting machine. When there is a considerable proportion of admixtures, the cleaning systems installed on the agricultural harvesting machine are not sufficient to achieve the required purity of crop. As such, the crop must be further cleaned in stationary cleaning devices. This leads to considerable extra expenditure, which greatly increases the costs of the harvesting process.

U.S. Pat. No. 4,869,272 discloses an axial-flow combine harvester having an axial-flow threshing and separating rotor with a rotatable rotor about its longitudinal axis. EP 0 591 688, discloses a rotor having dual functions of threshing and separating the grain from the harvested crop conveyed by the rotor. For this purpose, a front region of the rotor is the threshing zone and an adjoining rear region of the rotor is a separating zone. Both the threshing zone and the separating zone are enveloped at the top by shell surfaces. In the lower region of the rotor, the shell surfaces merge with concaves and separating grates for separating grain from straw mixture. At the beginning of the separating zone, the grains embedded in the crop stream are first moved into an outer region of the spiraling, rotating crop stream before they can pass through the openings of the separating grates. In axial-flow combine harvesters, this leads to a considerably higher proportion of admixtures being separated at the beginning of the separating zone, resulting in overloading the subsequent cleaning components.

The present invention is directed to overcome one or more of the problems as set forth above.

SUMMARY OF THE INVENTION

In one aspect of this invention, an agricultural harvesting machine having means for removing and separating grain from the harvested crop such that the harvested crop separated in the separating zones has a reduced proportion of admixtures.

In another aspect of the present invention, there is an agricultural harvesting machine for removing and separating grain from harvested crop, comprising, a threshing zone having threshing members for threshing crop; at least one separating zone having at least one axial separating rotor partially encased by a separating surface and operatively connected to the threshing zone for receiving the threshed crop from the threshing zone and for separating the grain, wherein sections of the separating zone are displaceable in the axial direction of the at least one axial separating rotor; means for separating the grain from the harvested crop; and means for removing the grain from the threshed crop, wherein at least the removal and partial preliminary separation of the grain from the threshed crop take place in the threshing zone.

In yet another aspect of the invention, the separation zone has a separating surface operatively connected to the at least one axial separating rotor, wherein the separating zone has sections which can be displaced in the axial direction of the at least one axial separating rotor to ensure that separation will not begin until a correspondingly large proportion of grains are arranged in an outer region of a rotating crop stream, so that the proportion of admixtures separated by the axial separating rotor remains small.

In still another aspect of the invention, displacement of sections of the separating zone is obtained by encasing the axial separating rotor in a separating surface and by at least partially closing the axial separating rotor with the separating surface.

In yet another aspect of the invention, a particularly advantageous effect of the invention is obtained if the axial separating rotor associated with a tangential threshing mechanism or the separating zone of an axial-flow threshing and separating rotor is constructed in the manner according to the invention.

In another aspect of the invention, the separating surface is segmented and the segments are pivotable to an open and closed position, wherein the separating surface is closed successively beginning in a crop entry region of the separating surface, and opened in the reverse order.

In another aspect of the invention, the separating surface holds, in the circumferential direction of the at least one axial separating rotor, a plurality of pivotable closure flaps. Each of the closure flaps are independently controlled and can close a portion of the separating surface, but in cooperation with closure flaps adjacent to it allows complete covering of the separating surface. In this way, it is ensured that each closure flap need only a small area for pivoting between its opened and closed positions, hence saving space.

In an aspect of the invention, there are closure flaps arranged in an axial direction of the axial separating rotor, so that displacement of sections in a front region of the separating zone is achieved in a structurally simple manner.

In another aspect of the invention, closure flaps are arranged adjacent to each other in a circumferential direction of the axial separating rotor and are pivotably connected to each other by a coupling member, so that a single displacing operation pivots all of the closure flaps that are operatively connected to each other simultaneously.

To simplify displacement of the closure flaps, the closure flaps arranged adjacent to each other in the circumferential direction of the axial separating rotor can be pivotably connected to each other by a coupling member, so that a single displacing operation pivots all the closure flaps connected to each other simultaneously.

In still another aspect of the invention, the closure flaps are opened and closed such that the closure flaps are arranged one behind the other and operatively and pivotably connected to each other by a common pivot mechanism.

In yet another aspect of the invention, there are closure flaps that are successively opened and closed by coupling members. The closure flaps move along slot guides that have curved paths, wherein the shape of the curved paths ensures that closing of the closure flaps begins at the beginning of the axial separating rotor and opening of the closure flaps begins with the closure flaps closest to the rotor end. The axial displacement is effected by displacement means known in the art, which are operatively connected to the slot guides by at least one coupling rod.

An aspect of the invention is slot guides pivotably arranged about a shaft pointing in the axial direction of the at least one axial separating rotor, wherein the shape of the slot guides ensure the order of opening and closing of the closure flaps. The arrangement of the slot guides can lead to a considerable reduction of displacement paths hence a space savings.

In another aspect of the invention, closure flaps are the displacement means, and the closure flaps are independent of each other and actuated independently of each other to achieve flexible displacement capacities.

In still another aspect of the invention, the agricultural machine has a plurality of axial separating rotors, displacement means and associated displacement mechanisms, wherein the displacement mechanism is arranged in a gap between the axial separating rotors to reduce the particles swirling around said gap.

In yet another aspect of the invention, the crop passing through the separating surface is not hindered in its movement by the closure flaps. Further, adjacent closure flaps can have such a pivot range that when in their opened position, they form the shape of a funnel opening in a radial direction.

In another aspect of the invention, displacement of sections in a front region of the separating zone facilitates separation of admixtures and depends on crop properties such as moisture, fracture behaviour, grain size. The displacement varies as a function of the separation of admixtures in the front region of the separating zone.

An aspect of the invention is achieved by displacing sections in a front region of the separating zone, wherein displacement is effected automatically as a function of the separation of admixtures. Sensors sense the proportion of admixtures, and a control and evaluation unit receive the sensed signal and use said signal to control the through flow of admixtures and to correct the through flow via opening or closing closure flaps.

The above aspects are merely illustrative and should not be construed as all-inclusive and limiting to the scope of the invention. The aspects and advantages of the present invention will become apparent, as it becomes better understood from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 2 is a cross-sectional view through line II—II of FIG. 1 with closure flaps located in an open position;

FIG. 3 is a cross-sectional view taken generally along line II—II of FIG. 1 with closure flaps located in a closed position;

DETAILED DESCRIPTION

Figure 1:
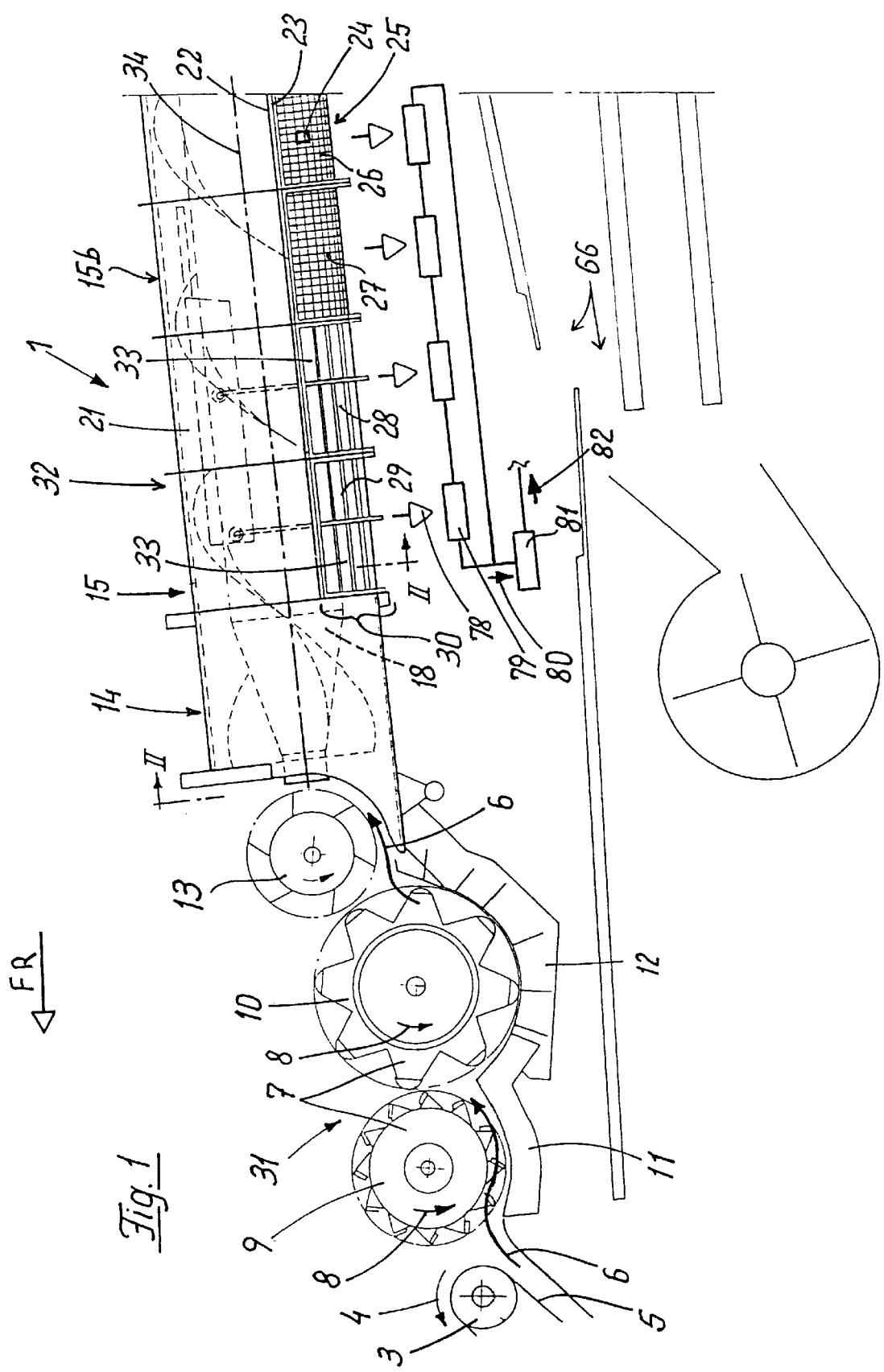
FIG. 1 is a side view of a combine harvester having a tangential threshing mechanism and axial separating rotor.
Figure 4:
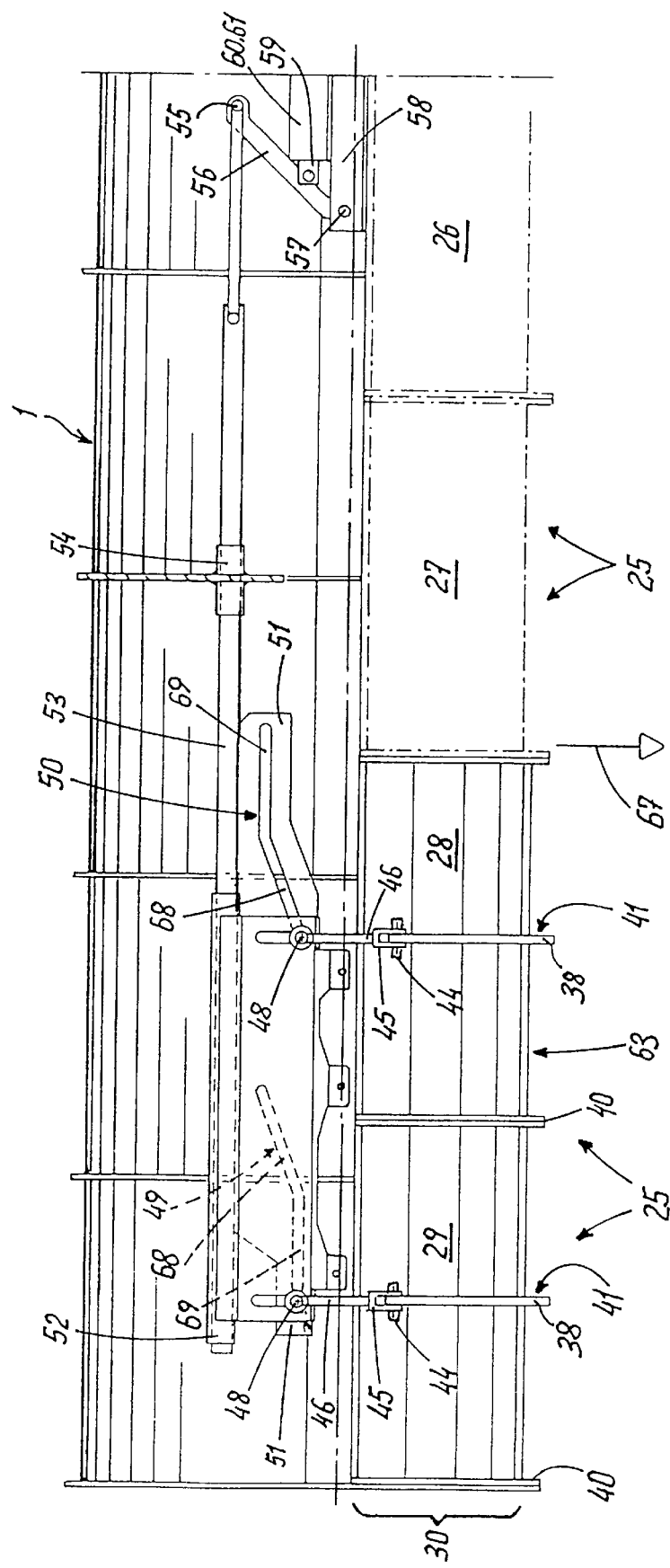
FIG. 4 is a detailed view of an axial separating rotor as shown in FIG. 1.

FIG. 1 shows an agricultural harvesting machine in the form of a combine harvester 1. The combine harvester 1 has a feed rake 3 at a front region as determined from the direction of travel FR when harvesting crop. As seen in FIG. 1, the feed rake 3 rotates counterclockwise as shown by arrows 4. Conveyor 5 transfers the harvested crop in a crop stream 6 from the feed rake 3 to a multi-cylinder threshing mechanism 7. The threshing mechanism 7 has threshing cylinders 9, 10, which rotate counterclockwise as shown by arrow 8. The threshing cylinders 9, 10 pick up and convey the crop stream 6 along concaves 11, 12 toward a feed roller 13. During the movement of the crop stream 6, grains are removed from the ears and at least partially separated on the concaves 11, 12 and delivered to subsequent working components. In a rear region of the threshing mechanism 7, the crop stream 6 is picked up by the feed roller 13 and delivered to an input region 14 of an axial separating device 15 arranged at an incline in the direction of the travel FR. It is contemplated that the multi-cylinder threshing mechanism 7 shown can be replaced by a single-cylinder threshing mechanism (not shown), and instead of the axial separating device 15 being a single-rotor, a twin-rotor or multi-rotor axial separating device 15a, 15b as shown in FIG. 2 can be mounted behind the threshing mechanism 7. Each of the axial separating devices 15a, 15b has an axial separating rotor 18. These rotors counter rotate as shown by arrows 16, 17. The axial separating devices 15a, 15b have circumferential surfaces 19 encompassed by entraining elements 20 of a shape capable of wrapping around the circumferential surfaces 19 in spiral form. Each of the axial separating rotors 18 is encased by a cover 21 at a top region. The covers 21 are operatively attached to mounting rails at its lower region, which releasably hold frame structures 23 of any convenient design. In a manner known in the art, the frame structures 23 are releasably attached to and hold a separating surface 25. The separating surface has through-openings 24. As shown in FIG. 4, the separating surface 25 are preferably a plurality of segments 26–29 which are operatively connected to the frame structure 23 forming a separating grate 30. In the combine harvester 1 shown in FIG. 1, the multi-cylinder threshing machine 7 defines a threshing zone 31 and the axial separating device 15 defines a separating zone 32.

As shown in FIGS. 2 and 3, first and a second segment 29, 28, respectively, of the separating surface 25 have closure flaps 33. The closure flaps 33 are spaced apart in the circumferential direction of the axial separating rotor 18. The closure flaps 33 are attached to the frame structure 23 of the separating grate 30 at a first end so as to be pivotable about shafts 35 extending in a axial direction 34 of the axial separating rotor 18. A sealing surface 36 is operatively attached or integral with each of the closure flaps 33. Spaced from the sealing surface 36 is an axially-extending pivot shaft 37. Each of the pivot shafts 37 is conveniently held non-rotatable by an arcuate coupling member 38, wherein the arcuate coupling member 38 non-rotatably holds one or more guide bolts 39. FIG. 4 shows first reinforcing struts 40 centrally associated with each of the front segments 28, 29 of the separating surface 25. The first reinforcing struts 40 are laterally and integrally formed. As shown in FIG. 3, second reinforcing struts 41 have slot guides 42. The slot guides 42 engage the guide bolts 39 formed integrally with the coupling members 38, so that the coupling members 38 can perform a pivot movement as shown by arrow 43 about the associated regions of the separating surface 25. The movement is dependent upon the length of the slot guides 42. The arcuate coupling members 38 are pivotably about and traversed to bolts 44. The bolts 44 are pivotably mounted to bifurcated heads 45. The bifurcated heads 45 are operatively attached to rod-shaped extensions 46. At an end distal from the bifurcated head 45, the rod-shaped extensions 46 each have an integrally formed ball socket 47. Each of the ball sockets 47 is operatively connected to a ball head 48. Each of these ball heads 48 is received at its end facing away from the ball socket 47 by slot guides 49, 50 which are conveniently formed in a flange plate 51. At the top of the flange plate 51 is an integrally formed hollow profile rod 52, which is operatively connected to a connecting rod 53. The connecting rod 53 is mounted by a bushing 54. At its end facing away from the flange plate 51, the connecting rod 53 is pivotably connected by a bolt 55 to a pivot lever 56. The pivot lever 56 is rotatably connected to the frame structure 23 of the separating surface 25 by a base bolt 57. The base bolt 57 is operatively connected to a holding flange 58. So the pivot lever 56 can perform a pivot movement about the bolt 55 held by the holding flange 58, the pivot lever 56 is engaged by a piston rod 59 of a lifting cylinder 60. It is contemplated that the lifting cylinder 60 can be replaced by any displacement apparatus 61 which allows a movement of the pivot lever 56 about the bolt 55 held by the holding flange 58.

As shown in FIG. 4, the piston rod 59 is retracted into the lifting cylinder 60. In this position the pivot lever 56 which is pivotably connected to the piston rod 59 has displaced the connecting rod 53 so far in the direction of the rear end of the axial separating device 15 that the bolts 48 which traverse the slot guides 49, 50 of the flange plate 51 abut against the end of the slot guides 49, 50. Here the bolts 48 are in their lowest position in the vertical direction within the slot guides 49, 50. In this position, the extensions 46 connecting the coupling members 38 to the slot guides 49, 50 also occupy their lowest position vertically. As shown in FIG. 3 this leads to the coupling members 38 being held in a position in which the guide bolts 39 associated with them abut against the bottom end of their slot guides 42. Each coupling member 38 is operatively connected by pivot shaft 37 to the respective closure flap 33. In this manner each pivot shaft 37 passes through an oblong hole 62 formed in the coupling members 38. This allows the pivot shafts 37 which pass through the coupling members 38 to be able to compensate for changes of length occurring during pivoting of the coupling members 38. When coupling member 38 is in the FIG. 3 position, the closure flaps 33 connected by pivot shaft 37 to the coupling member 38 have pivoted in the direction of the separating surface 25, and are in their closed position indicated at 63. In closed position, crop 65 is precluded from passing through the through-openings 24 and from being received by subsequent working components, such as a cleaning device 66 known in the art and therefore not described in more detail. can be effectively displaced axially of the axial separating rotor 18. With the closure flaps 33 in closed position, a separating zone 67 (see FIG. 4) Depending on the number of segments having closure flaps 33, the length of the closable separating surface 25 can be selected.

Referring again to FIG. 4, the lifting cylinder 60 can be selectively pressurized to extend the piston rod 59 and displace connecting rod 53 toward the front end of the axial separating device 15. Consequently the slot guides 49, 50 are also displaced in this direction. In the process, bolt 48 travels first through a region 68 ascending in a vertical direction and the closure flaps 33 pivot from the closed position to an open position as indicated at 70 in FIG. 2. In the open position the crop 65 passing through the separating surface 25 moves to the subsequent working components.

Note that while the closure flaps 33 of the rear segment 28 perform the pivot movement described, the closure flaps 33 of the segment 29 in front remain closed. This is because the front slot guide 49 is differently shaped. If the piston rod 59 is now further extended, the bolt 48 associated with front slot guide 49 passes into a vertically ascending region 68. In this way the closure flaps 33 of the segment 29 in front are now also pivoted from closed to open position.

If the pressurization of the lifting cylinder 60 is now varied in such a way that the piston rod 59 is retracted into the lifting cylinder 60, the closure flaps 33 of the segments 28, 29 pivot in the reverse order. In this way, first the closure flaps 33 of the segment in front 29 in the direction of travel FR pivot from the open position 70 to the closed position 63, and only when this pivot movement is over do the closure flaps 33 of the segment 28 also move from the open position 70 to the closed position 63.

It is contemplated that the length of closure flaps 33 can be varied in the axial direction 34 of the axial separating device 15, wherein then the lengths of the individual regions 68, 69 of the slot guides 49, 50 must be adapted to the new geometrical conditions. Also, the coupling members 38 centrally associated with the segments 28, 29 can be arranged at any point in the region of the segments 28, 29 in order to force the movement defined by the shape of the slot guides 49, 50 on the closure flaps 33.

Figure 5:
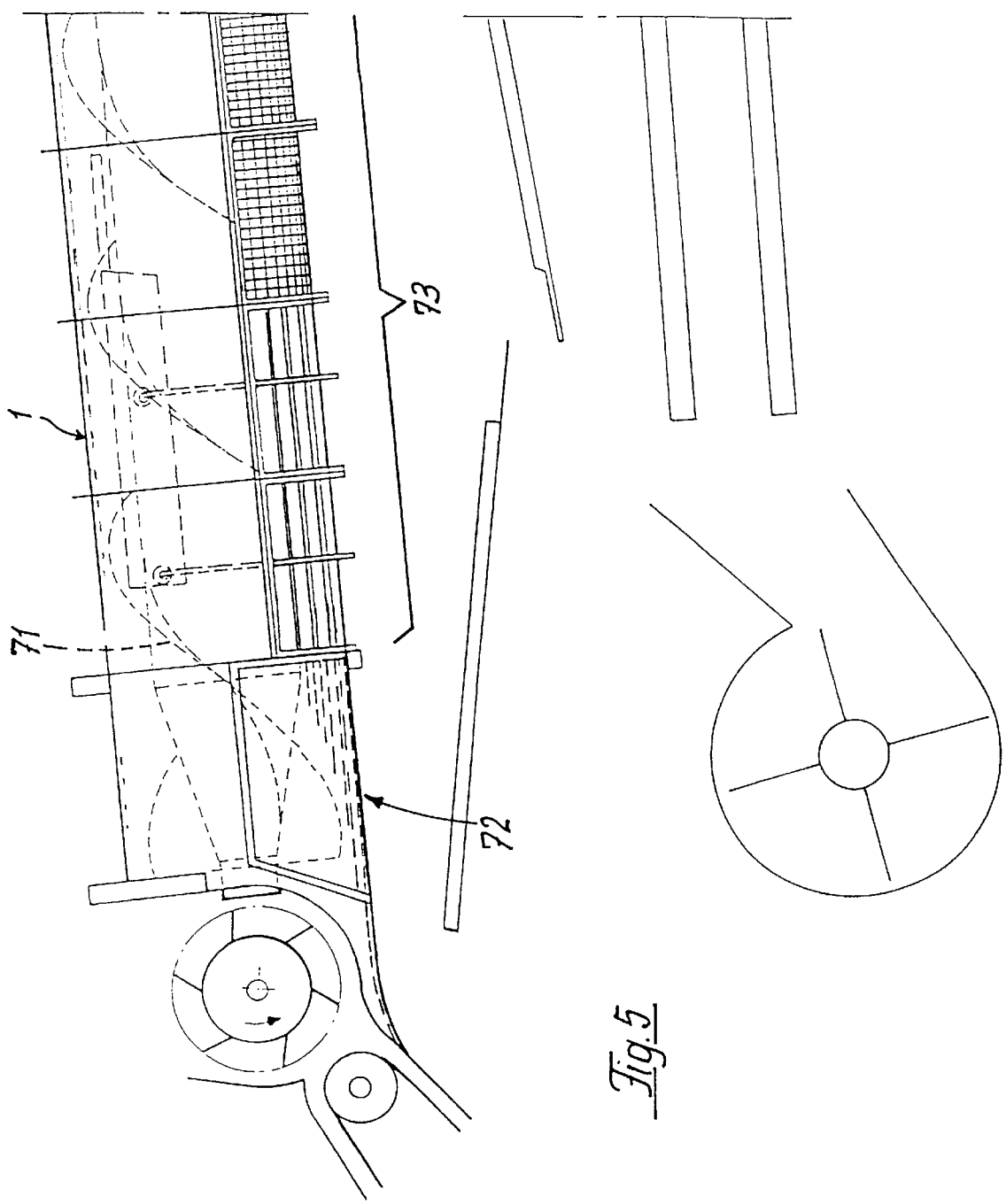
FIG. 5 is a side view of a combine harvester having an axial threshing and separating rotor.

The example of the axial separating device 15 mounted behind a multi-cylinder threshing mechanism 7 can also be applied to so-called axial threshing and separating rotors 71, which is shown in FIG. 5. Such axial threshing and separating rotors 71 are usually divided into a threshing zone 72 and a separating zone 73, wherein the structure and function of the separating zone 73 essentially correspond to the structure and function of the separating zone 32 already described for the axial separating device 15, so that the invention is easily applied to the axial threshing and separating rotors 71.

Figure 6:
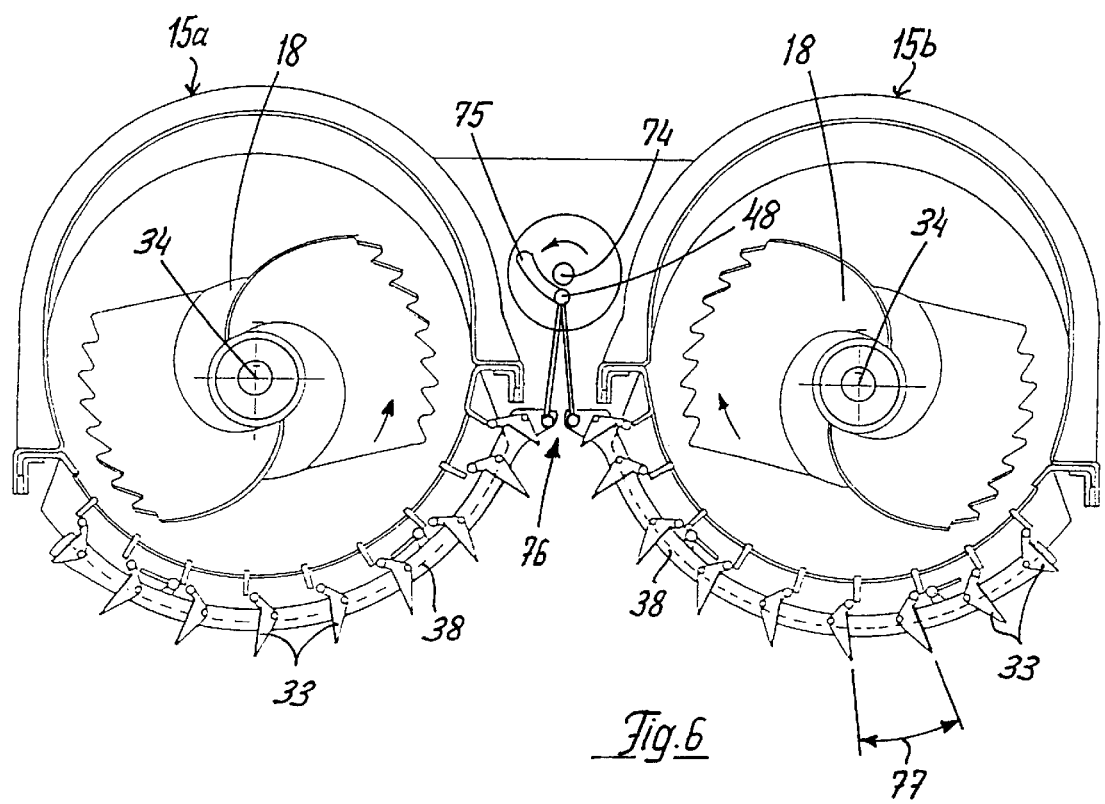
FIG. 6 is a cross-sectional view like FIG. 3, but illustrating an alternative embodiment of a pivot mechanism.

Referring now to FIG. 6, the slot guides 49, 50 previously described and which trigger the pivot movement of the closure flaps 33 can be designed as slot guides 75 rotating about a shaft 74 pointing in the axial direction 34 of the axial separating rotor or rotors 18, wherein the bolt 48 passing through these slot guides 75 in turn transmits, by means of a coupling mechanism 76, movement defined by the slot guides 75 to the coupling members 38 of the closure flaps 33. Such a design requires less space, as means for converting a linear movement to a rotational movement can be eliminated.

Separate displacement apparatus 61 may be used to move the closure flaps 33 of the segment 28, 29 of the separating surface 25. The actuation of the closure flaps 33 are coordinated with each other in such a way that the closure flaps 33 pivot in a manner according to the invention so that displacement of the earliest separating zone 67 in the axial direction 34 of the axial separating device or devices 15 is possible.

In order that the crop 65 passing through the separating surface 25 is not hindered by the closure flaps 33 located in the open position 70, the closure flaps 33 are shaped in such a way that adjacent closure flaps 33 in the open position 70 span between them creating a throughput zone 77, which opens in a radial direction as a funnel shape pointing away from the separating surface 25.

In a further advantageous embodiment, at least one sensor unit 79 is placed in a crop stream 78 for sensing the separation of admixtures at the separating surface 25 and for sending the sensed measurement signal or signals 80 to a control unit 81. In the control unit 81, depending on the input signal 80 an output signal 82 is generated, which leads to automatic displacement of the earliest separating zone 67 of the separating surface 25. At its simplest, the output signal 82 can regulate pressurization of the displacement means 61 designed as a lifting cylinder 60, so that the closure flaps 33 automatically open or close in the manner according to the invention. The closing and opening of the closure flaps 33 are regulated so that with an increasing proportion of admixtures in the separated crop stream 78, a larger number of the closure flaps 33 is closed. Conversely, with a decreasing proportion of admixtures in the separated crop stream 78, a large number of closure flaps 33 is opened.

The invention in its broader aspects is not limited to the specific mechanisms shown and described but departures may be made therefrom within the scope of the accompanying claims without departing from the principles of the invention and without sacrificing its chief advantages.

What is claimed is:

1. An agricultural harvesting machine for removing and separating grain from harvested crop, comprising:
    a threshing zone having threshing members for threshing harvested crop;
    a separating zone operatively connected to the threshing zone for receiving the threshed crop from the threshing zone and for separating the grain from the threshed crop, the separating zone having an axial separating rotor partially encased by a separating housing, the separating housing having a plurality of sections which are selectively opened to provide a separating zone and closed to preclude separation; and
    means for selectively opening and closing at least one of the sections for displacing a location of the separating zone in an axial direction of the axial separating rotor.

2. The agricultural harvesting machine according to claim 1, further including:
    a front region of the separating housing wherein the displacement of the front region of the axial separating rotor is effected by at least partially closing the separating housing.

3. The agricultural harvesting machine according to claim 1, further including:
    a tangential threshing mechanism used in the threshing zone for threshing.

4. The agricultural harvesting machine according to claim 1, wherein the separating housing is segmented into segments in an axial direction of the axial separating rotor.

5. The agricultural harvesting machine according to claim 4, wherein the segments are closed in successive order and opened in a reverse order.

6. The agricultural harvesting machine according to claim 5, wherein successive closing of several of the segments of the separating housing begins with the segment adjacent to the front region of the separating housing.

7. The agricultural harvesting machine according to claim 1, further comprising:
    a plurality of pivotable closure flaps adjacent each other and operatively attached to the separating housing in a circumferential direction of the axial separating rotor, wherein the closure flaps in the closed position close a region of the separating housing.

8. The agricultural harvesting machine according to claim 1, further including a plurality of closure flaps pivotably mounted in an axial direction of the axial separating rotor and adjacent to each other in a circumferential direction of the at least one axial separating rotor, wherein the closure flaps in the closed position close a region of the separating surface.

9. The agricultural harvesting machine according to claim 1, further including closure flaps pivotably connected to each other by a coupling member and adjacent to each other in a circumferential direction of the axial separating rotor.

10. The agricultural harvesting machine according to claim 1, further including a plurality of closure flaps pivotably and successively arranged in an axial direction of the axial separating rotor and coupled to each other by at least one pivot mechanism to successively close the closure flaps from the front region of the axial separating zone and open the closure flaps in reverse order.

11. The agricultural harvesting machine according to claim 1, further including:
    coupling members;
    closure flaps controlled by the coupling members and arranged adjacent to each other in a circumferential direction of the axial separating rotor; and
    slot guides in the pivot mechanism, wherein by displacement of the slot guides, the coupling members perform a pivot movement in the circumferential direction of the at least one axial separating rotor, thereby pivoting the closure flaps from a closed position to an open position and from the open position to the closed position.

12. The agricultural harvesting machine according to claim 11, further including:
    at least one connecting rod for operatively connecting the slot guides to means for displacing, wherein the means for displacing displaces the slot guides in the axial direction of the at least one axial separating rotor.

13. The agricultural harvesting machine according to claim 1, further including:
    coupling members;
    closure flaps arranged adjacent to each other in a circumferential direction of the axial separating rotor;
    slot guides in the coupling members and arranged pivotably about a shaft pointing in an axial direction of the axial separating rotor; and
    wherein when pivoting the slot guides, the closure flaps pivot from a closed position to an open position and from the open position to the closed position.

14. The agricultural harvesting machine according to claim 1, further including:
    coupling members;

means for displacing slot guides and operatively connected to the coupling members; and means for controlling the means for displacing.

15. The agricultural harvesting machine according to claim 1, wherein there are two axial separating rotors arranged adjacent to each other, and a coupling mechanism operatively attached to closure flaps, wherein the closure flaps are arranged in a region between the axial separating rotors.

16. The agricultural harvesting machine according to claim 11, wherein when the closure flaps are in an open position, throughput in a radial direction is increased.

17. The agricultural harvesting machine according to claim 2, wherein displacement in the front region is effected as a function of the separation of admixtures at the separating surface.

18. The agricultural harvesting machine according to claim 17, further including:

means for sensing the separation of admixtures in the crop stream separated at the separating surface; and means for generating an output signal for automatic displacement of the front region of the separating surface in response to the signal.

19. An agricultural harvesting machine for removing and separating grain from harvested crop, comprising:

a threshing zone having threshing members for threshing harvested crop;

a separating zone operatively connected to the threshing zone for receiving the threshed crop from the threshing zone and for separating the grain from the threshed crop, the separating zone having an axial separating rotor partially encased by a separating housing, the separating housing having a plurality of sections, each section having a plurality of pivotally-mounted, axially-extending vanes which are moveable between an open position to provide a separating zone and a closed position to preclude separation; and means for selectively opening and closing the vanes of at least one of the sections.

* * * * *